US012766743B2

(12) United States Patent
Wong et al.

(10) Patent No.: US 12,766,743 B2
(45) Date of Patent: Oct. 20, 2026

(54) ROBOTIC ARM MANIPULATOR INTERCHANGE TOOL

(71) Applicant: Emage Vision Pte. Ltd., Singapore (SG)

(72) Inventors: Soon Wei Wong, Singapore (SG); Lew Siang Charles Cher, Singapore (SG)

(73) Assignee: Emage Vision Pte. Ltd., Singapore (SG)

( * ) Notice: Subject to any disclaimer, the term of this patent is extended or adjusted under 35 U.S.C. 154(b) by 819 days.

(21) Appl. No.: 18/303,040

(22) Filed: Apr. 19, 2023

(65) Prior Publication Data

US 2024/0351221 A1 Oct. 24, 2024

(51) Int. Cl.
*B25J 15/00* (2006.01)

(52) U.S. Cl.
CPC .................................. *B25J 15/0066* (2013.01)

(58) Field of Classification Search
CPC .......................... B25J 15/0066; B25J 15/0408; B25J 15/0491; B25J 15/0441; B25J 9/1612; B25J 15/04; B25J 15/0483; B25J 19/0025; B25J 9/08; B25J 9/1646; B25J 15/0052; B25J 15/0433; B25J 15/0425; B25J 15/0458; B25J 15/0019; B25J 15/0057
USPC ................. 294/87; 73/865.6; 904/16, 30, 50
See application file for complete search history.

(56) References Cited

U.S. PATENT DOCUMENTS

| | | | | |
|---|---|---|---|---|
| 4,604,787 | A * | 8/1986 | Silvers, Jr. | B23Q 7/046 414/730 |
| 5,145,227 | A * | 9/1992 | Monford, Jr. | B64G 4/00 414/737 |
| 5,879,277 | A | 3/1999 | Dettman et al. | |
| 2022/0063111 | A1 * | 3/2022 | Wong | B25J 15/0009 |
| 2022/0241962 | A1 | 8/2022 | Nguyen et al. | |

FOREIGN PATENT DOCUMENTS

| | | |
|---|---|---|
| JP | 1991118541 | 12/1991 |
| JP | 1992035889 | 3/1992 |
| JP | 2000-091794 A | 3/2000 |
| KR | 10-2021-0017173 A | 2/2021 |
| KR | 10-2021-003220 | 3/2021 |

OTHER PUBLICATIONS

Japanese Patent Office, Office Action and Search Report issued in corresponding JP Application No. 2023-208644, Feb. 19, 2025 (and English translation).
Korean Patent Office, office action issued in corresponding KR Application No. 10-2024-0052646, Mar. 10, 2026 (and English translation).

* cited by examiner

*Primary Examiner* — Jacob A Smith
(74) *Attorney, Agent, or Firm* — Wood, Herron & Evans, LLP

(57) ABSTRACT

A simple interchange mechanism is provided for a robot arm to reliably, quickly and consistently change over from one end effector to another for the purpose of executing multiple tasks without the need to install different robots. The interchange mechanism incorporates mechanical and electromagnetic elements at three different areas that work synchronously, resulting in a flexible and scalable architecture that is simple yet stable, and adaptable to different configurations of the robot.

9 Claims, 8 Drawing Sheets

ROBOTIC ARM MANIPULATOR INTERCHANGE TOOL

FIELD OF INVENTION

A simple interchange mechanism for changing End Effectors or manipulators at the distal end of the Robot Master Arm, to enable quick and reliable changeovers that are flexible and scalable. It also includes a computer interface for transmitting and receiving commands from the Master Robot based on the task to be performed. This mechanism eliminates the need for a complex alignment process when seeking the latching position of the End Effector and Master Arm during loading or unloading process, resulting in a robust and stable mechanism irrespective of the size and weight of the End effector.

DESCRIPTION OF RELATED ART

Modern manufacturing is normally fully automated involving work such as assembling and processing of industrial products which are small in size and have complex structure and dimensions. Products such as Semiconductor assembly, Automotive parts assembly, manufacturing of Contact lenses, optical lenses and miniature mechanical parts are some of the examples which are usually assembled and inspected for quality before packing for final shipment to customers. Such components are small-size precision components in many cases, and have a wide variety of shapes and are required to be consecutively manufactured at high speed mainly using a single master robot apparatus. Therefore, at the manufacturing site, changing the setup including interchanging of the End effector and tools of a Robot apparatus are required, depending upon the workpiece and related processes. For this reason, there is an increasing demand for automatic setup change, in which configuration changes are performed by programming the Robot apparatus.

In manufacturing sites, depending upon the type of components to be assembled or manufactured, a configuration setup is executed in the form of exchanging End effectors, arms or tools of the robot apparatus according to a workpiece type along with a change in the process flow. Significant manual efforts and working time are required for a worker to manually change the configuration of conventional robot apparatus, and there is a requirement for a so-called automated configuration change which may include, End effector change along with a change in the programming of the robot apparatus as far as possible.

In view of the above circumstances, the Robot apparatus is required to have a compact and simple configuration, specifications and performance that allow gripping, assembling, and processing of various kinds of workpieces. At the same time, it is desired to increase the operation rate of the entire Robot apparatus by automatically interchanging tools to suit the task to be performed on the workpieces.

It is therefore necessary for the Robot apparatus to have a simple interchange mechanism to cater for different configurations of End effectors to enable handling and manipulating a wide variety of workpieces quickly, efficiently and consistently to enhance the functional features of the robot apparatus.

With regard to the automatic exchange of an operating unit such as the End effectors of the Robot apparatus, it is required to reduce the size and weight of the End effector where possible, shorten the time to interchange them and the constituent elements thereof, and enhance the attachment accuracy at the time of the interchange. The interchange system includes the End effectors held by the interchange tool or gripper and the Master arm. Moreover, in the case of a tool such as a Robot hand or the End effector, portions of fingers for handling a workpiece may be exchangeable in some cases. The changeover from one configuration to another includes an electrical interface to operate the Robot hand or End effector using software commands and electrical signals. The electrical interface includes a suitable mechanism for the master robot to detect what configuration of the End effector or manipulator and whether it has been mechanically locked in position so as to ensure proper loading and verification of the changeover End effector. Details of electrical and command interface protocol are not disclosed as it falls outside the scope of this invention. While past prior arts have extensively disclosed changeover of Robot end effectors, they are time consuming and involve manual intervention for proper setup, alignment and configuration. They are also complex, inflexible, not scalable and require frequent intervention for proper operation.

SUMMARY OF THE INVENTION

Aspects of the present invention provide a simple interchange mechanism that is designed to reliably and consistently engage/attach or disengage/detach an End effector integrated with a robotic hand, to the Master robot arm, accurately and consistently in the shortest possible time. The interchangeable mechanism design comprises three areas. While reference is made to End effector throughout this document, it is important to note that an End effector will always have a Robot hand integrated to it which may differ in its functionality depending upon the task at hand.

The first interchange area involves the End effector engaging part, the second area is the Master side arm and the third area is a tool or gripper, to engage and disengage the Master arm and End effector.

The End effector interchange area primarily includes a couple of torsion spring loaded levers that can rotate around their respective circular axis up to a predetermined angle; a magnetic steel plate that mates on the surface to an Electromagnet mounted on the Master Arm and at least two recesses to accommodate the Master arm pickup hooks.

The second interchange area is the distal end of Master arm that includes a Electromagnet mounted in the centre of the arm and at least two extensions formed like a book around the centre of the Electromagnet, designed to suitably align with the steel plate of the end effector for better stability. The two extension hooks function as the latching points between the Master Arm and the End effector with the Levers functioning as a latching lock that enables the stable attachment of the End effector to the Master Arm.

The third interchange area is the interchange mechanism that includes a simple cover plate that moves in its horizontal axis and functions to move the levers on the End effector side outwardly, to expose the recesses below, before the Master arm extension hooks move down into the End effector recess. It also functions to grip the End effector in place using a pair of grippers during the process of latching and unlatching the End effector to the Master Arm. During the loading process, after the Master Arm has moved down into the End effector recess, the top cover of the interchange tool moves back or retracts, releasing the two levers which are restored to its original position by the torsion springs. This completes the attachment process of the Master arm to the end effector. The Master arm is now free to move away from the interchange tool with the end effector firmly attached for further tasks to be performed. During the unloading process, the top cover of the interchange tool moves forward to push the End effector levers outward simultaneously unlatching the Master Arm from the End effector. The Master arm will then move up to disengage with the End effector and complete the detachment process. The process is complete with the Top cover of the interchange tool moving back to its original position.

During the attachment or detachment process the interchange tool involved operates with a set of spring-loaded Claw grippers, an inline top cover that moves back and forth to push the spring-loaded levers of the end effector, that in turn executes the latching and unlatching process. The simplicity of the interchange tool along with the mechanism at the ends of the Master Arm and End Effector form the basis for the present invention.

Further features of the present disclosure will become apparent from the following description of exemplary embodiment with reference to the attached drawings.

DETAILED DESCRIPTION OF DRAWINGS

Embodiment of the present invention will be described with reference to the attached drawings. The embodiment below is described for mere illustration, and the configuration of the details can be appropriately changed by those skilled in the art without departing from the spirit of the present invention. Words such as "Manipulator" and "End effector" are used interchangeably in this document.

Figure 1:
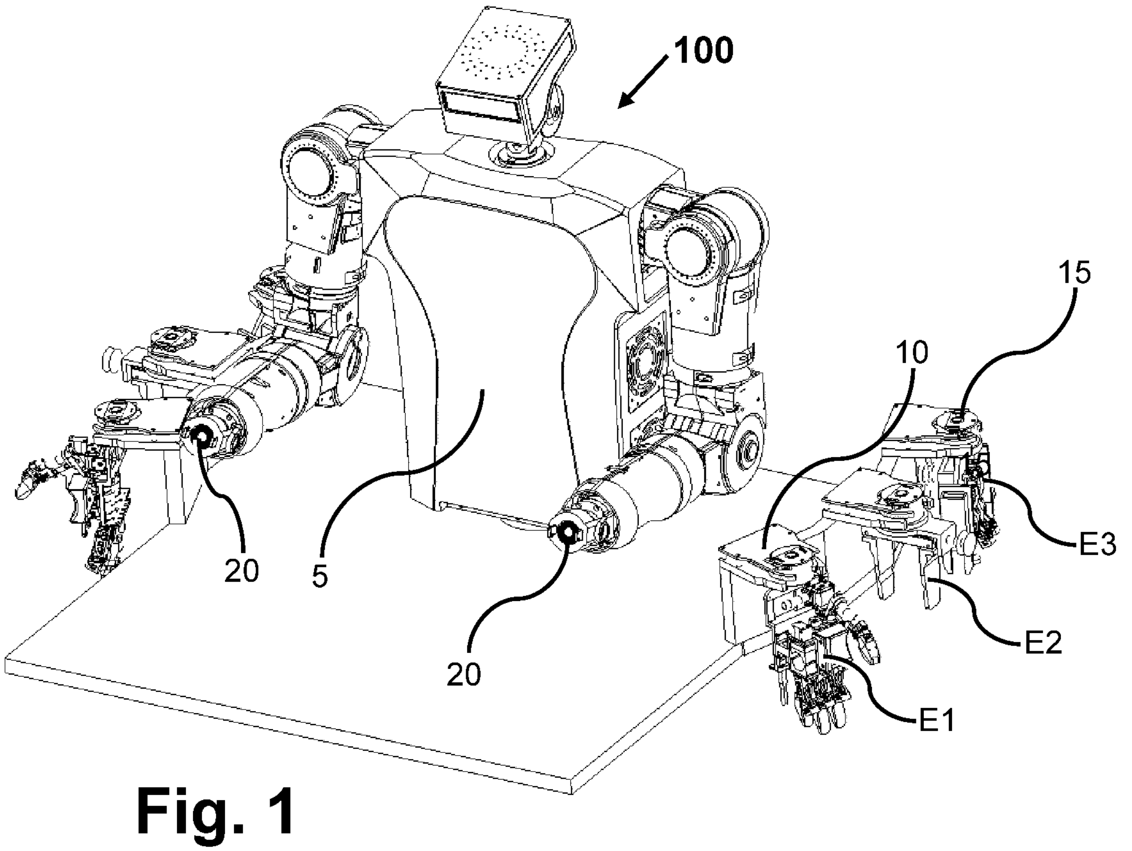
FIG. 1 is a perspective view of a Robot apparatus with several End effectors positioned around it.

FIG. 1 illustrates an example of the configuration of a Robot Arm interchange system according to an embodiment of the present invention. FIG. 1 is an explanatory diagram illustrating a configuration of a Robotic Arm interchange system 100 that includes a Robotic apparatus 5, multiple interchange tools 10, multiple End effectors 15 integrated to multiple Robot hands E1, E2 and E3 and a pair of Robot Master arms 20.

Figure 3:
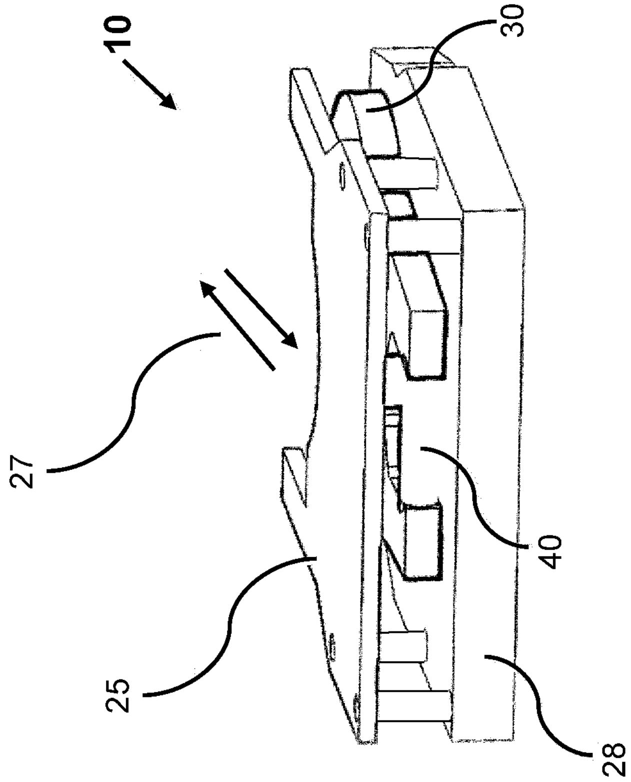
FIG. 3 is a perspective view of the opposite side of FIG. 1.
Figure 2:
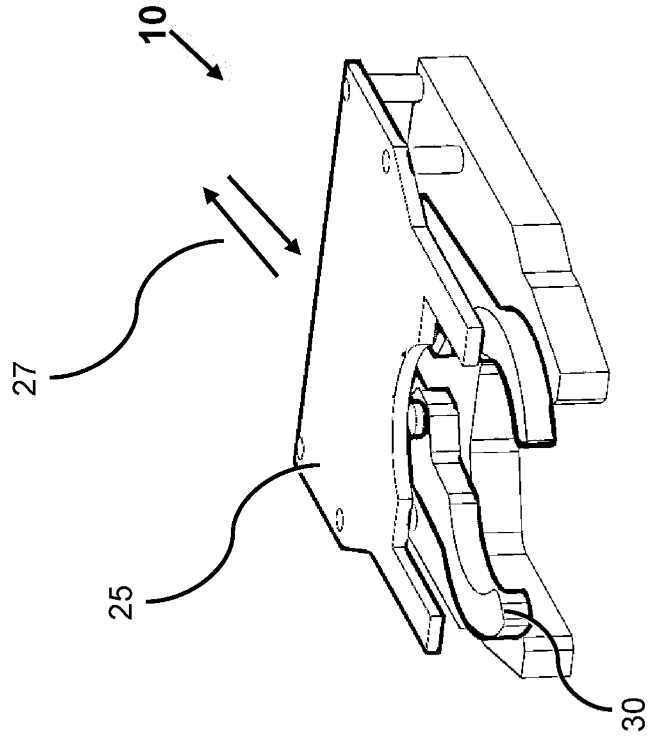
FIG. 2 is a perspective view of the interchanging tool of the present invention.

FIG. 2 and FIG. 3 shows two perspective views of an interchange tool 10. The tool comprises a horizontally movable Top cover 25 capable of moving bidirectionally 27, below which is a End effector gripper 30 suitably integrated with a Spring 40 as shown in FIG. 3, that functions to hold the grippers 30 in the closed position. The workpieces 25, 30 and 40 are suitably integrated to a Base plate 28, that together forms the interchange tool. The interchange tool 10 functions to hold the End effector integrated with Robot hands (E1, E2, E3 . . . etc as in FIG. 1) and enables Master arm 20 in FIG. 1, to load or unload different End effectors.

Figure 5:
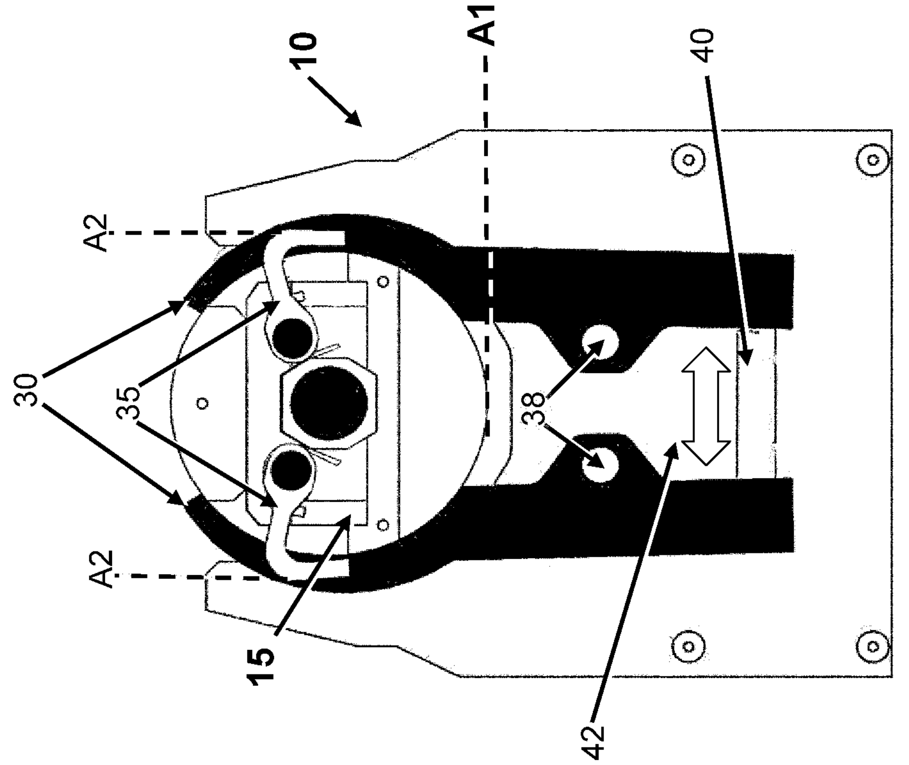
FIG. 5 is a bottom view of the interchanging tool of the present invention with the Robot End effector after completion of the docking process.
Figure 4:
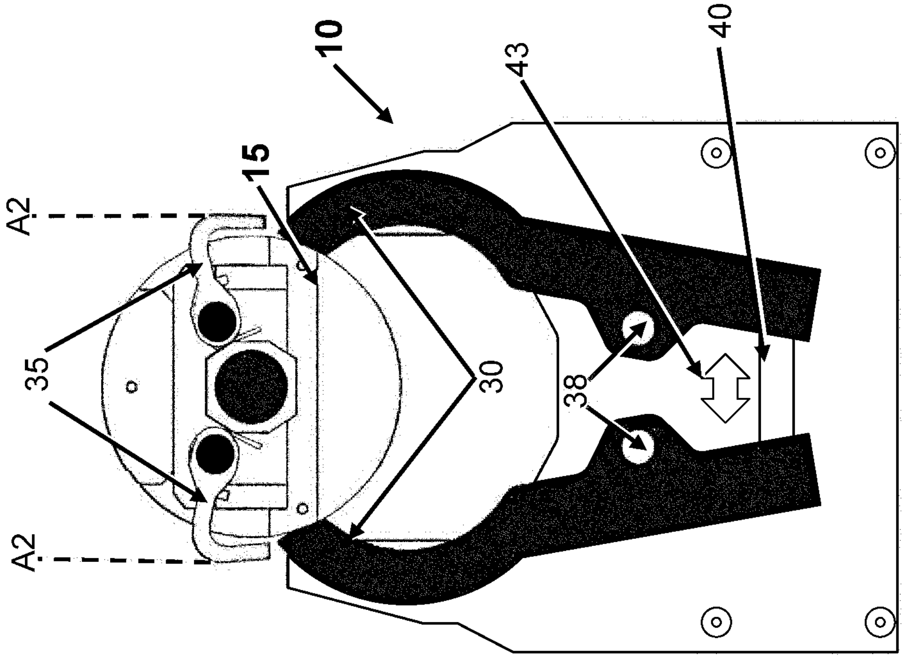
FIG. 4 is a bottom view of the interchanging tool of the present invention with the Robot End effector ready to be docked.

FIGS. 4 and 5, shows the bottom view of the interchange tool 10 (Top cover 25 not shown) for better understanding of the gripper function. In FIG. 4, during the process of unloading an End effector, the End effector 15 is pushed towards the Grippers 30 (which is normally closed due to the effect of the Spring 40 which compresses in direction 43) forcing the Grippers 30 to open to accommodate the End effector. It is important to note the position A2 of levers 35 in FIG. 4 for reference and explanation during the loading and unloading process of the End effector.

In the next step, referring to FIG. 5, when the End effector 15 moves to position A1, a sensing mechanism (not shown) immediately stops the Master Arm 20 in FIG. 1, from moving any further, simultaneously enabling the Grippers 30 to hold the End effector 15 in place by the force of the Spring 40. The grippers 30 are mounted at two fulcrum points 38 and forcibly held closed by spring 40 due to force of the spring indicated by 42. It is important to note the simplicity of the End effector 15 loading process using tool 10, designed using the Gripper 30 and Spring 40. This feature is key to the case of use and scalability of the interchange tool 10.

Figure 6:
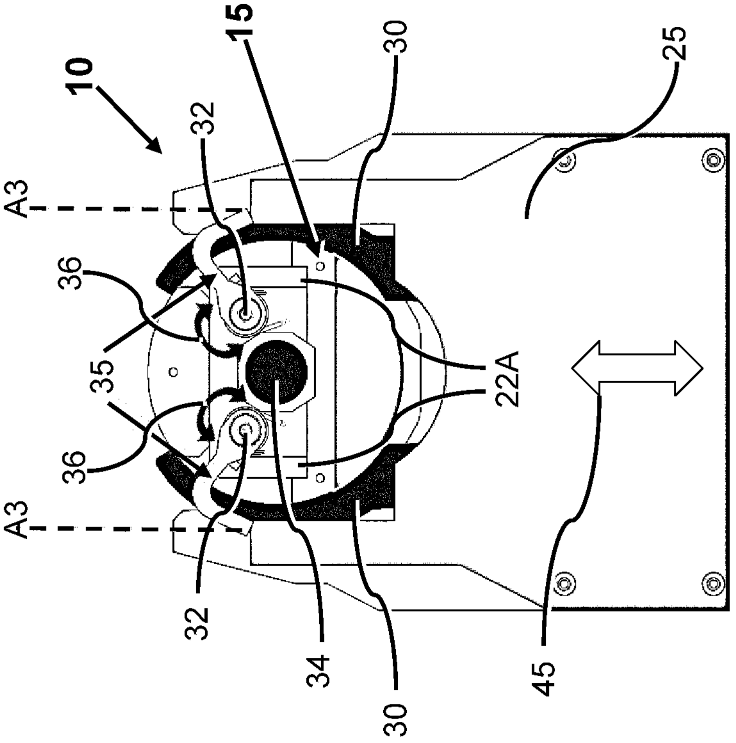
FIG. 6 is a bottom view of the interchanging tool of the present invention with the Robot End effector levers extended out to expose the recess access for the Master Arm to move down.

The interchange tool 10 in FIG. 6 shows the End effector 15 firmly held in place by gripper 30. A magnetic steel plate 34 mounted at the centre of the End effector 15 enables a stable and sturdy mechanical fixation to the Electromagnet mounted on the Master Arm 20 in FIG. 7 which will be explained below.

Figure 7:
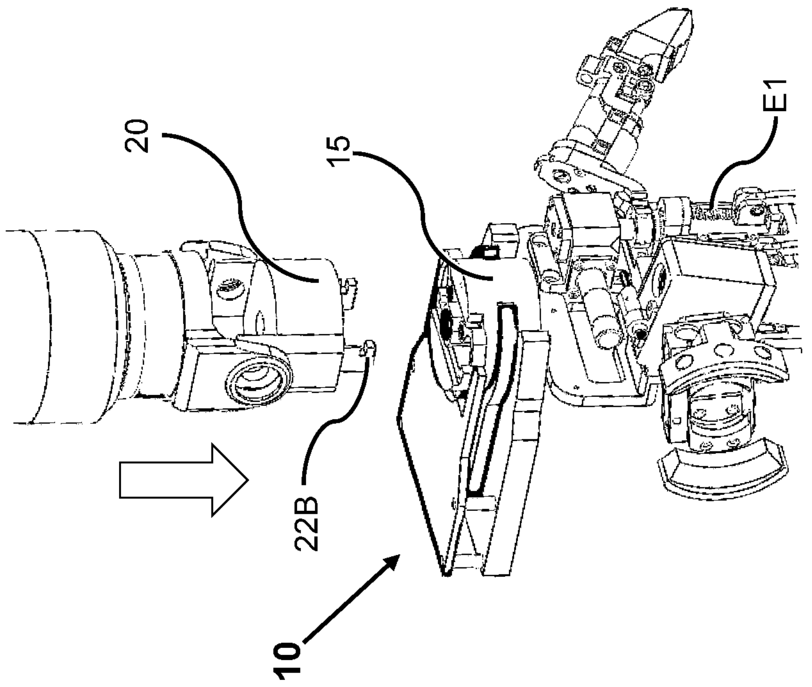
FIG. 7 is a perspective view of the Master Arm ready to move down to latch on to the End effector held in position by the Interchange tool.
Figure 9:
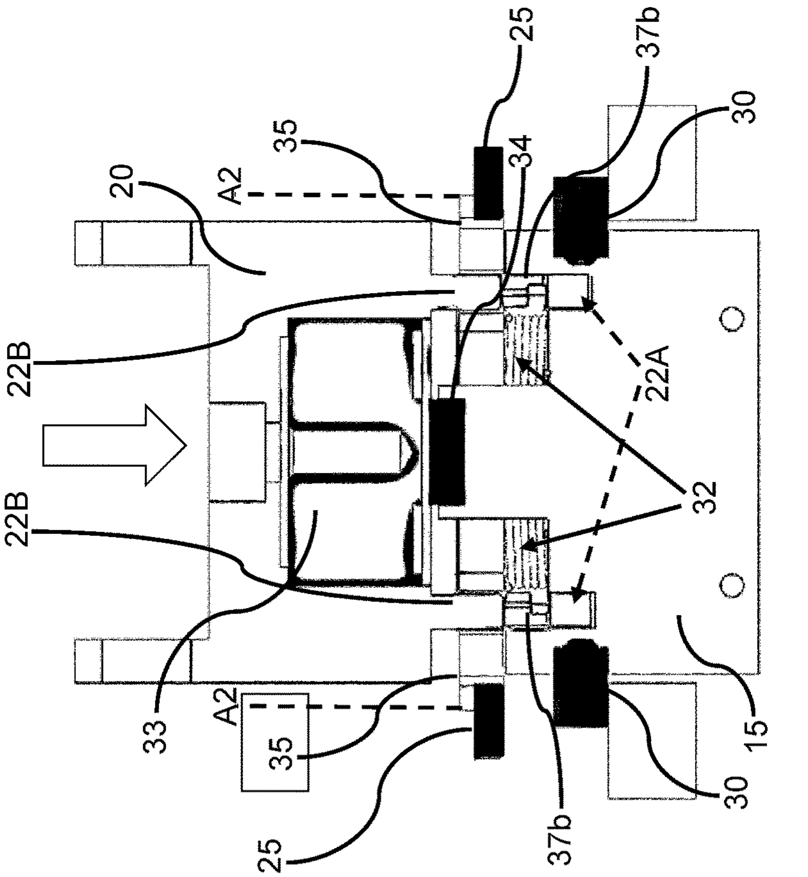
FIG. 9 is a cross section view of the Master Arm and End effector held by the interchanging tool after the Master Arm hooks has reached the bottom point of the recess in the End effector and with the Top cover of the interchange tool retracted and the Levers moving back to its original position resulting in the Lever's latch engaging with the Master Arm hooks.
Figure 8:
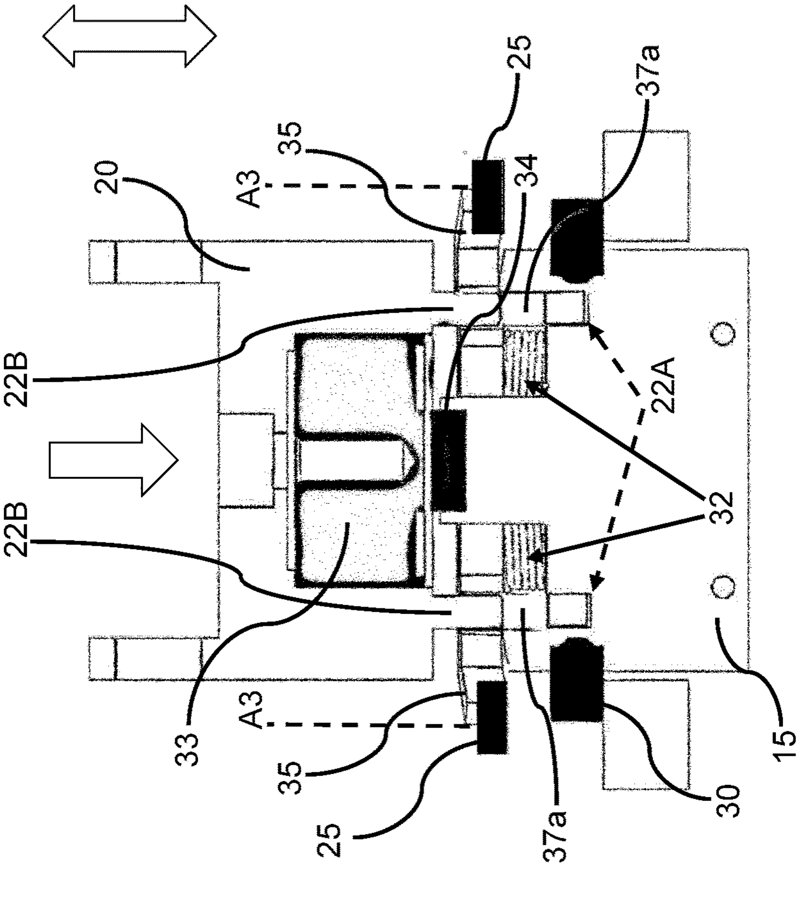
FIG. 8 is a cross section view of the Master Arm and End effector held by the interchanging tool after the Master Arm hooks has reached the bottom point of the recess in the End effector.

In the next step, the process of engagement or attachment of the end effector 15 to the Master arm 20 in FIG. 7 will be described. Referring to FIG. 6, the End effector 15 is designed with a pair of recess locations 22A to allow the Master arm hooks 22B in FIG. 7 to engage the End effector 15. Hereinafter, the recess 22A of FIG. 6 and the Master arm hooks 22B of FIG. 7 are sometimes referred to as generic name, latching mechanism. The latching and unlatching process between the Master arm 20 and End effector 15 integrated to the Robot hand E1 in FIG. 7, begins with the Top cover 25 of the interchange tool in FIG. 6 pushing the pair of levers 35 of the End effector 15, resulting in the pair of recesses 22A becoming accessible for the Master Arm hooks 22B to move down and begin the process of engagement. Referring to FIG. 8, the Master Arm 20 proceeds to move down towards the End effector 15 and stops when the Master Arm hooks 22B of the Master Arm 20 is inside the recess 22A of the End effector 15. It is important to note that as the levers 35 are in position A3, the latching process is not complete as shown by the empty area in 37A. An electromagnet 33 is electrically and mechanically integrated at the centre of Master arm 20 to enable a strong holding force with the steel plate 34 mounted at the centre of the End effector 15, when the electromagnet 33 is energised. Referring to FIG. 9, the top cover 25 of the interchange tool retracts allowing the levers 35 to return to their original position A2, simultaneously latching on to the Master arm hooks 22B of Master Arm 20 as shown in 37B. Note that the pair of levers 35 moves to A2 position by the force of the Torsion spring 32. The energising of the Electromagnet 33 enables the magnetic force to hold in place the End effector 15 via the steel plate 34 resulting in completion of the End effector 15 latching process to the Master Arm 20. Referring to FIG. 9, a major feature of the present invention is the fool proof latching of the End effector 15 to the Master Arm 20 even in the event of electrical failure leading to de-energisation of the Electromagnet 33. The pair of Master Arm hooks 22B is safely latched to the pair of End effector Levers 35, due to the torsion spring force of 32 in FIG. 9, ensuring that the End effector 15 does not detach from the Master Arm 20. This safety feature results in a damage free and safe environment during the operation of the Robot 5 in FIG. 1, irrespective of the task that is being performed.

Figure 10:
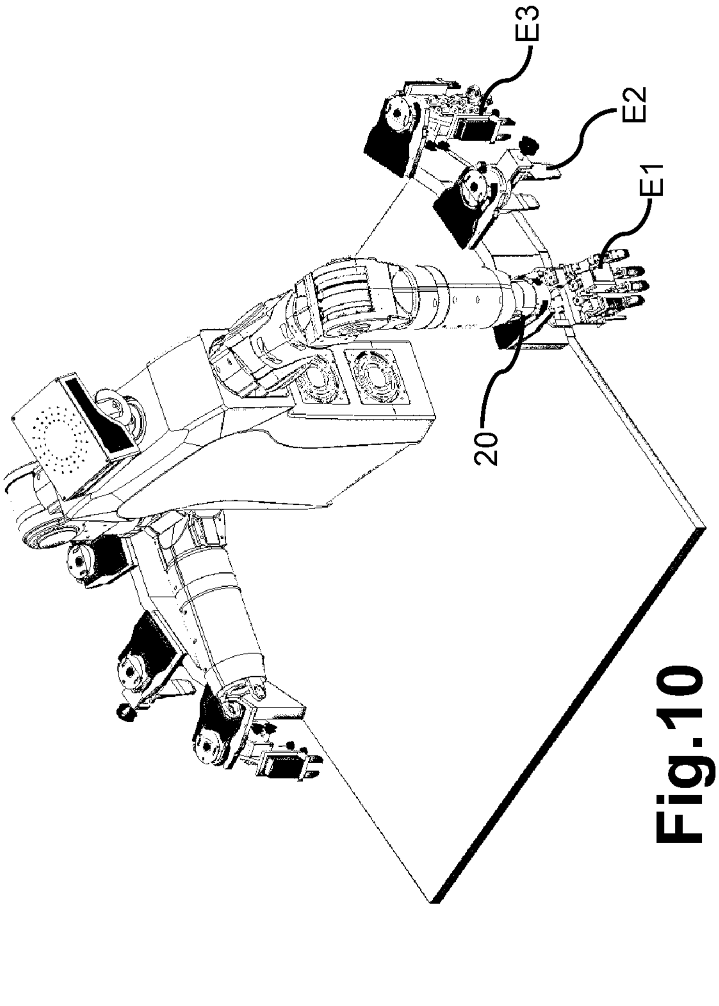
FIG. 10 is a perspective view of a Robot apparatus showing the Master Arm latched on to one of the End effector.

FIG. 10 is a perspective view of the Robot Master Arm 20 latched on to the End effector 15 and ready to be unloaded from the interchange tool 10.

Figure 11:
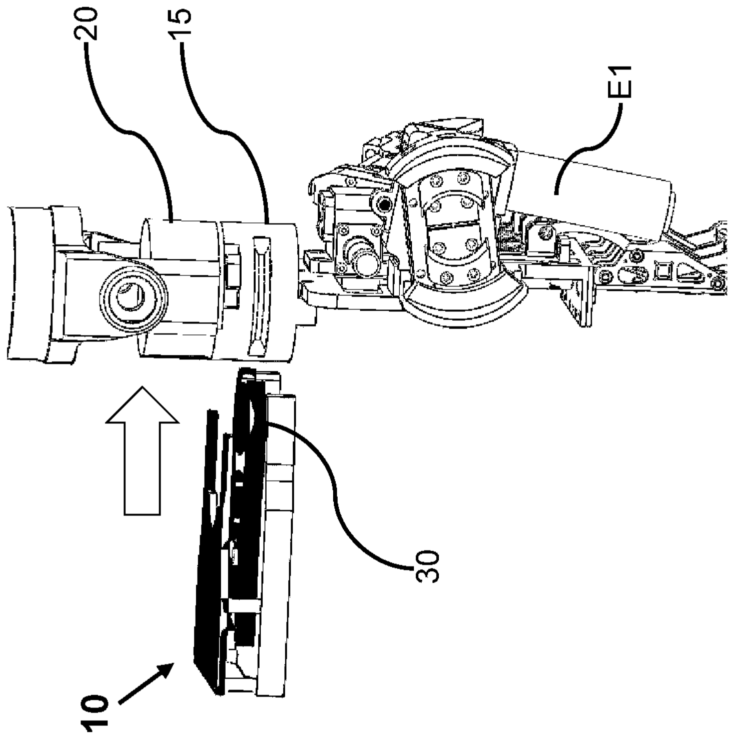
FIG. 11 is a perspective view of the Master Arm moving away from the interchange tool with the End effector engaged or latched in position.

FIG. 11 is a perspective view of the Robot Master Arm 20 moving away from the interchange tool 10 completing the unloading process. To understand the unloading process, reference is made to FIG. 4 wherein the grippers 30 of the interchange tool 10 is held in the closed position by the force of the spring 40. The Master Arm 20 in FIG. 11 moves away, forcing the grippers 30 to open up as illustrated in FIG. 4.

The process of loading and unloading the End effector 15 to/from the interchange tool 10 is controlled by the force of the spring 40, which makes the mechanism simple, effective and scalable.

Figure 12:
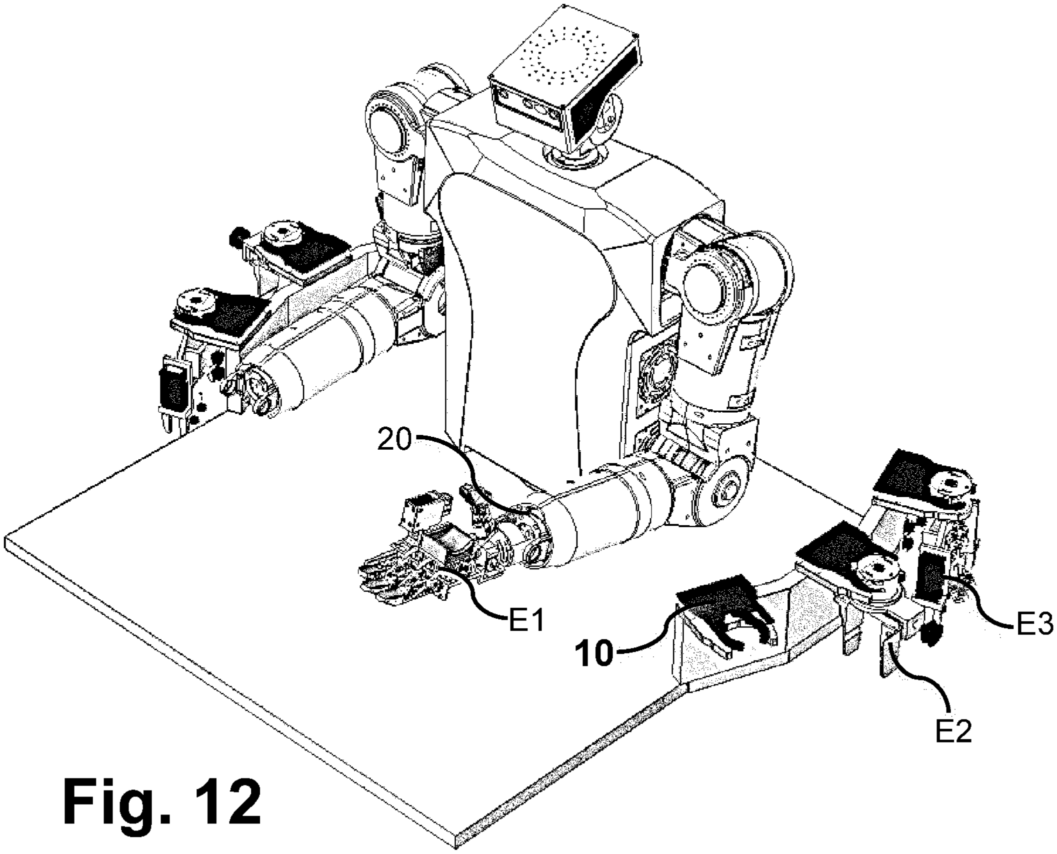
FIG. 12 is a perspective view of a Robot apparatus with an End effector and ready for the next task at hand.

FIG. 12 is a perspective view of the Robot with the Master Arm 20 latched on to the End effector 15 integrated to the Robot arm E1 and ready to proceed to the next task as programmed by the user. The unloading process is the same for E2, E3 (FIG. 10) or any other type of End effector depending on the type of task.

Figure 13:
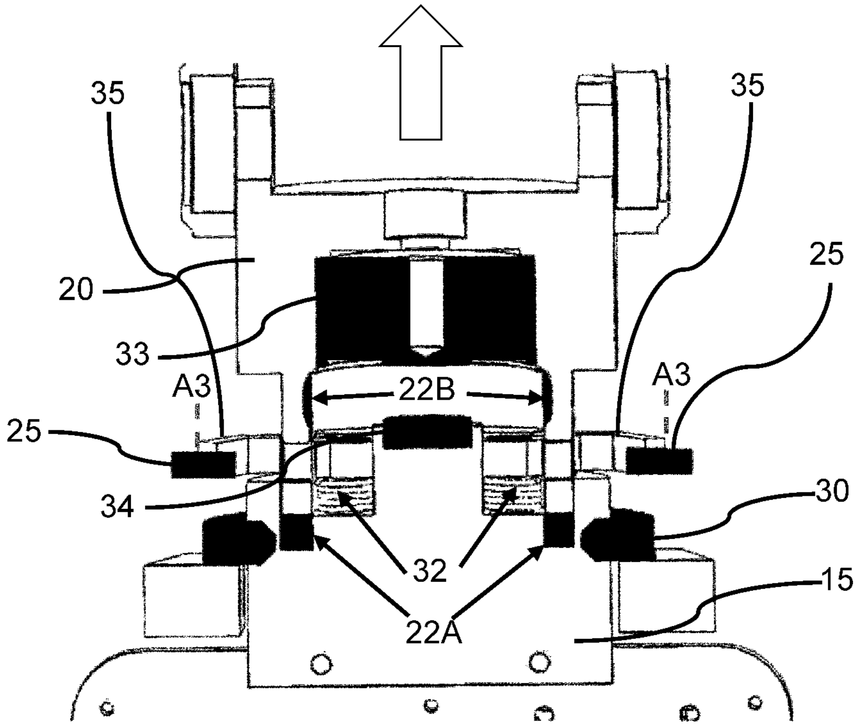
FIG. 13 is a cross section view of the Master Arm and End effector held by the interchanging tool after the Master Arm has moved up and out of the recess in the End effector, and with the Top cover of the interchange tool pushing the Levers out, resulting in the latch disengaging with the Master Arm hooks as part of the unloading process of the End Effector.

FIG. 13 is a cross section view of Master Arm 20 and the End effector 15, disengaged. Referring to FIG. 8, the process of unlatching or disengagement begins with the Top cover 25 of the interchange tool 10 pushing the levers 35 to move out to position A3. As evident in FIG. 8, the levers 35 unlatch and clear the way as illustrated in 37*a* ensuring that the recess 22A is now free for Master Arm hooks 22B of the Master Arm 20, to move up. In FIG. 13, the electromagnet 33 is first de-energised, after which the Master Arm 20 moves up and away from the End effector 15 as shown in FIG. 13. The Robot apparatus 5 moves back to a predetermined position as illustrated in FIG. 1. The disengagement or unlatching process between the Master Arm 20 and End effector 15 is now complete.

The use of actuators, motors or other swinging or rotating mechanisms are not discussed herein, as it is outside the scope of the invention. Further, it should be recognized that the terms such as (Attach, Latch, Engage) and (Detach, Unlatch, Disengage) are often used interchangeably.

While the present invention has been described with reference to an embodiment, it is to be understood that the invention is not limited to the disclosed exemplary embodiment. The scope of the following claims is to be accorded the broadest interpretation so as to encompass all such modifications and equivalent structures and functions. One with ordinary skill in the art would recognize and appreciate many variations, modifications, and alternatives which may become apparent upon reading the foregoing description.

What is claimed is:

1. An interchange mechanism configured to detach or attach a master robot arm to an end effector, the mechanism comprising:

a master robot arm integrated in the centre with an electromagnet and at least two protruding hooks for engaging with an end effector;

an interchangeable tool comprising a horizontal moving top cover, below which is a spring-loaded gripper to grip the end effector, both mounted on a plate for mechanical stability; and an end effector mechanically integrated to robot hands adapted to different tasks, a magnetic plate aligned with the electromagnet of the master robot arm to achieve a gripping force when engaged, at least two spring-loaded levers used for latching and unlatching with the protruding hooks of the master robot arm and at least two recesses mechanically aligned to accommodate the protruding hooks of the master robot arm for engagement.

2. The interchange mechanism of claim 1, wherein the master robot arm is configured to move up and down during the process of attachment or detachment with the end effector.

3. The interchange mechanism of claim 1, wherein the gripper of the interchange tool is mounted with a spring to hold the end effector in its place.

4. The interchange mechanism of claim 1, wherein the interchange tool's top cover is configured to open and close the spring-loaded levers of the end effector during the attachment and detachment process.

5. The interchange mechanism of claim 1, wherein the master robot arm protruding hooks engage with the end effector recesses, with the at least two spring-loaded levers that function to latch or unlatch the master robot arm to the end effector.

6. The interchange mechanism of claim 5, wherein the electromagnet of the master robot arm ensures engagement with the end effector due to magnetic force when energised.

7. The interchange mechanism of claim 5, wherein the protruding hooks of the master robot arm and a pair of spring-loaded latching levers ensures the end effector stays engaged to the master robot arm in the event of electrical power failure.

8. The interchange mechanism of claim 1, wherein the protruding hooks of the master robot arm and a pair of spring-loaded latching levers in combination with the electromagnet are configured to execute the attachment and detachment of the end effector to the master robot arm.

9. The simple-interchange mechanism of claim 1, wherein multiple interchange tools holding different end effectors integrated with different robot hands designed for a specific task, are mounted around a robot, to aid in changeovers during configuration of the robot.

* * * * *